(12) United States Patent
Inoue

(10) Patent No.: US 8,602,383 B2
(45) Date of Patent: Dec. 10, 2013

(54) SUCK-BACK VALVE

(75) Inventor: Atsushi Inoue, Gyoda (JP)

(73) Assignee: Surpass Industry Co., Ltd, Gyoda-Shi, Saitama (JP)

(*) Notice: Subject to any disclaimer, the term of this patent is extended or adjusted under 35 U.S.C. 154(b) by 523 days.

(21) Appl. No.: 12/675,885

(22) PCT Filed: Sep. 8, 2008

(86) PCT No.: PCT/JP2008/066168
§ 371 (c)(1),
(2), (4) Date: Mar. 1, 2010

(87) PCT Pub. No.: WO2009/034944
PCT Pub. Date: Mar. 19, 2009

(65) Prior Publication Data
US 2010/0230626 A1    Sep. 16, 2010

(30) Foreign Application Priority Data

Sep. 12, 2007 (JP) ................................ 2007-236182

(51) Int. Cl.
*F16K 31/00* (2006.01)
*B05B 15/00* (2006.01)

(52) U.S. Cl.
USPC ............. 251/63.5; 239/119; 239/106; 251/77

(58) Field of Classification Search
USPC ......... 251/62, 63, 63.4, 63.5, 63.6, 68.5, 284, 251/285, 77, 79; 239/119, 106
See application file for complete search history.

(56) References Cited

U.S. PATENT DOCUMENTS 4,597,719 A * 7/1986 Tano ............................. 417/317
5,971,296 A * 10/1999 Fukano et al. ................ 239/119
(Continued)

FOREIGN PATENT DOCUMENTS

EP      1 203 908 A2    5/2002
JP      U 1991-25086    3/1991
(Continued)

OTHER PUBLICATIONS

Notice of Patent Grant, dated May 15, 2012, for corresponding Japanese Application No. 2007-236182.

(Continued)

*Primary Examiner* — John K Fristoe, Jr.
*Assistant Examiner* — Daphne M Barry
(74) *Attorney, Agent, or Firm* — Thomas & Karceski, PC

(57) ABSTRACT

A suck-back valve includes a piston and a valve body linked via a shaft portion. An open/close valve, operated by fluid pressure, is provided with a suck-back function. A suck-back chamber formed in an internal channel of the open/close valve and an actuator that operates the piston are separated by a diaphragm linked to and operating with the shaft portion. The shaft portion includes a valve-body-side shaft portion and a piston-side shaft portion. The piston-side shaft portion is loosely fitted to the valve-body-side shaft portion, allowing for independent movement in an axial direction. The closing operation of the valve body involves a two-step operation where, first, the shaft portion, along with the piston and the diaphragm, moves to the fully closed position of the valve body and where, second, the piston-side shaft portion moves with the piston and the diaphragm to increase the volume of the suck-back chamber.

8 Claims, 3 Drawing Sheets

(56) References Cited

U.S. PATENT DOCUMENTS

| | | | |
|---|---|---|---|
| 6,029,903 A * | 2/2000 | Fukano et al. | 239/119 |
| 6,176,438 B1 * | 1/2001 | Sato et al. | 239/119 |
| 6,200,100 B1 * | 3/2001 | Yang et al. | 417/26 |
| 7,070,160 B2 * | 7/2006 | Ijichi et al. | 251/63.5 |
| 7,143,956 B2 * | 12/2006 | Fukano | 239/119 |
| 7,337,805 B2 * | 3/2008 | Brown et al. | 137/625.33 |
| 2004/0007686 A1 * | 1/2004 | Kingsford et al. | 251/335.3 |
| 2005/0006609 A1 | 1/2005 | Fukano | |
| 2010/0038567 A1 * | 2/2010 | Inoue | 251/63.6 |

FOREIGN PATENT DOCUMENTS

| | | |
|---|---|---|
| JP | 10-252918 | 9/1998 |
| JP | 11-51223 | 2/1999 |
| JP | 2002-316085 A | 10/2002 |
| JP | 2003-278927 | 10/2003 |

OTHER PUBLICATIONS

Office Action for corresponding European Patent Application No. 08830960.4, mailed Jul. 28, 2011.

* cited by examiner

SUCK-BACK VALVE

CROSS REFERENCE TO RELATED APPLICATIONS

This is a National Stage United States Non-Provisional Patent Application that relies for priority on PCT Patent Application No. PCT/JP2008/066168, filed On Sep. 8, 2008, and also relies for priority Japanese Patent Application No. 2007-236182, on Sep. 12, 2007, the contents of both of which are incorporated herein by reference.

1. Field of the Invention

The present invention relates to a suck-back valve having a suck-back function that prevents the occurrence of leakage during the fully closing operation of an open/close valve.

2. Description of Related Art

Conventionally, for example, for an open/close valve disposed in a pipeline system for liquid such as chemicals, a separate valve exclusively for "suck-back" has been additionally provided to prevent leakage (dripping of the fluid) that occurs during the fully closing operation. Such a valve exclusively for suck-back operates synchronously with the closing operation of the open/close valve, and it is possible to prevent leakage by actuating a diaphragm in a direction that increases the volume of a suck-back chamber, thus sucking liquid on the outlet side to the suck-back chamber side (for example refer to Patent Citation 1.

Patent Document 1:

Japanese Unexamined Patent Application, Publication No. 2002-316085.

SUMMARY OF THE INVENTION

However, in the above-described conventional valve exclusively for suck-back, because the open/close valve and the valve exclusively for suck-back are separate objects, there is a problem in that the apparatus as a whole requires a larger space for installation.

In addition, the open/close valve and the valve exclusively for suck-back are each operated by actuators that use air pressure, etc.; therefore, it is difficult to synchronize both actuators to reliably prevent leakage.

Furthermore, depending on the fluid handled by the valve exclusively for suck-back, there is a concern that fluid adhering to an operating portion that realizes suck-back may become a cause of malfunction.

Against such a background, there has been a need for a suck-back valve in which an open/close valve is provided with a suck-back function, i.e., a suck-back valve in which the open/close valve and the valve exclusively for suck-back are integrated, in order to reduce the installation space and to solve the problem of synchronization. In such a suck-back valve, it is desirable to include a measure against malfunction of the suck-back function caused by adhesion of the fluid to be handled thereby.

The present invention has been conceived in light of the above situation, and an object thereof is to provide suck-back valve equipment with an open/close valve having a suck-back function.

To solve the above-described problems, the present invention adopts the following solutions.

A suck-back valve according to the present invention is a suck-back valve in which a piston and a valve body that receive fluid pressure for the open/close operation are linked via a shaft portion, and an open/close valve that carries out the open/close operation of the valve body by the fluid pressure is provided with a suck-back function, wherein a suck-back chamber formed in a valve internal channel of the open/close valve and an open/close operation portion that operates the piston are separated by a diaphragm that is linked to and integrally operates with the shaft portion; the shaft portion is divided into a valve-body-side shaft portion and a piston-side shaft portion, and the piston-side shaft portion is loosely fitted to the valve-body-side shaft portion, allowing for independent movement in an axial direction; and during the closing operation of the valve body, a two-step operation is carried out, including a valve closing operation step in which the shaft portion, along with the piston and the diaphragm, moves to the fully closed position of the valve body, and a suck-back operation step in which the piston-side shaft portion moves with the piston and the diaphragm to increase the volume of the suck-back chamber.

With the present invention described above, in the suck-back valve, the suck-back chamber formed in the valve internal channel of the open/close valve and the open/close operation portion that operates the piston are separated by the diaphragm that is linked to and integrally operates with the shaft portion; the shaft portion is divided into the valve-body-side shaft portion and the piston-side shaft portion, and the piston-side shaft portion is loosely fitted to the valve-body-side shaft portion, allowing for independent movement in the axial direction; and during the valve closing operation, a two-step operation is carried out, including the valve closing operation step in which the shaft portion, along with the piston and the diaphragm, moves to the fully closed position of the valve body, and the suck-back operation step in which the piston-side shaft portion moves with the piston and the diaphragm to increase the volume of the suck-back chamber. Therefore, with the shared use of the actuator, a single suck-back valve can carry out opening/closing of the valve and suck-back for preventing leakage.

In the above-described invention, it is preferable that the loose-fitting portion, in which the piston-side shaft portion is loosely fitted to the valve-body-side shaft portion, be provided closer to the open/close operation portion side than to the diaphragm. Accordingly, the loose-fitting portion can be prevented from coming into contact with the fluid flowing in the valve internal channel.

In this case, it is preferable that the outer periphery of the loose-fitting portion be covered with bellows that are integral with the diaphragm. Accordingly, the loose-fitting portion can be smoothly operated without coming into contact with the fluid flowing in the valve internal channel, and moreover, the operation range thereof can be increased.

In the above-described invention, it is preferable that suck-back level adjusting portion, which regulates the amount of axial movement of the piston-side shaft portion, be provided. Accordingly, the suck-back level can be appropriately adjusted to be optimized in accordance with various conditions.

With the present invention described above, it becomes possible to achieve the open/close operation of the valve and the suck-back function with a single actuator, and the suck-back valve provided with the suck-back function in the open/close valve can be provided. As a result, because an open/close valve and a valve exclusively for suck-back are integrated in a suck-back valve, the installation space can be reduced and the problem of synchronizing the actuator can be solved.

Because the loose-fitting portion that carries out the suck-back operation is configured so as not to come in contact with the fluid flowing in the valve internal channel, the fluid to be handled, such as chemicals, does not adhere to the loose-fitting portion. Therefore, it is possible to prevent the occurrence of malfunction of the suck-back function and to increase the reliability of the suck-back valve.

DETAILED DESCRIPTION OF EMBODIMENTS OF THE INVENTION

An embodiment of a suck-back valve according to the present invention will be described below based on the drawings.

Figure 1:
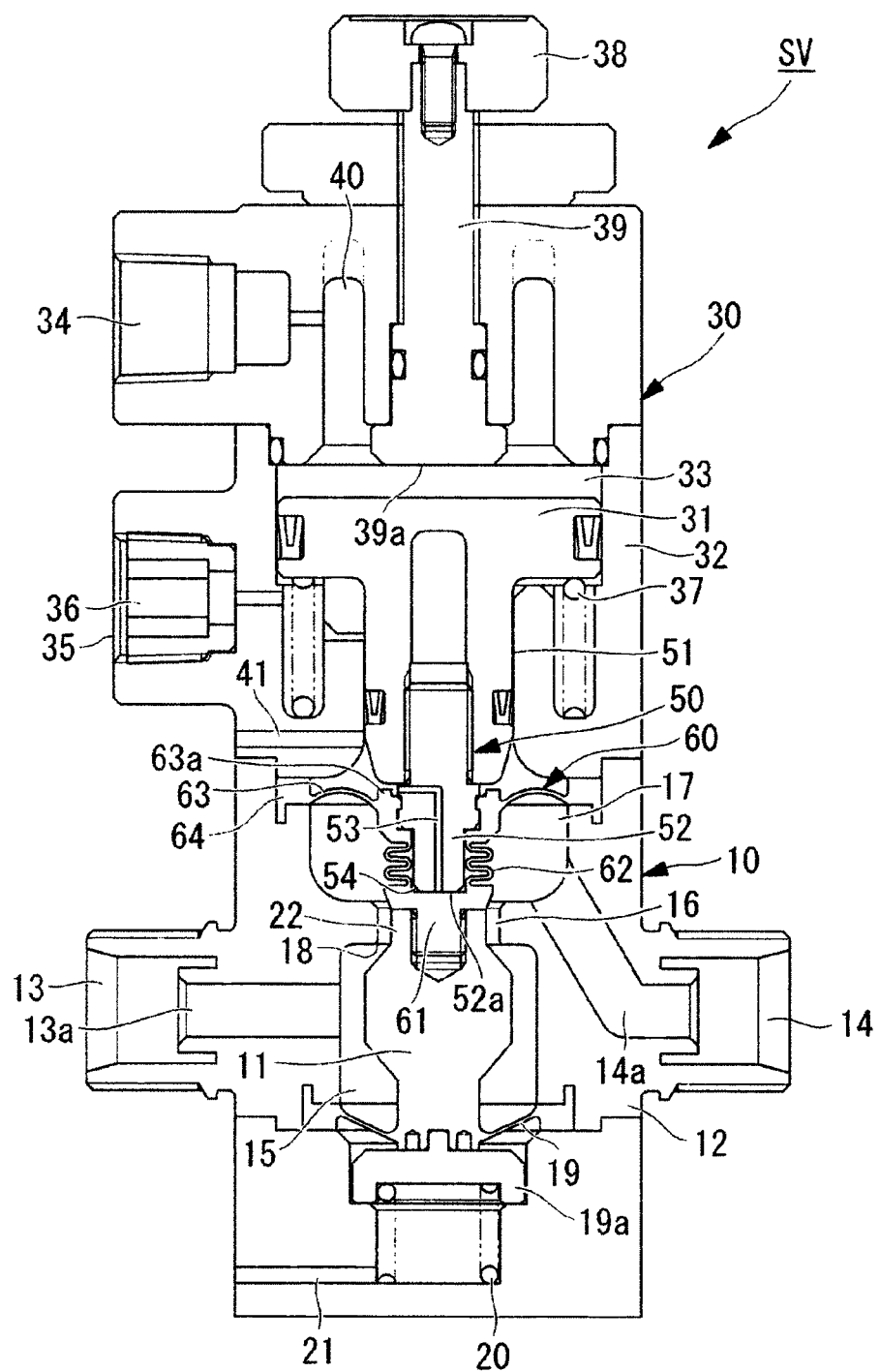
FIG. 1 is a sectional view showing an embodiment of a suck-back valve according to the present invention, showing a state in which an open/close valve is fully opened.
Figure 2:
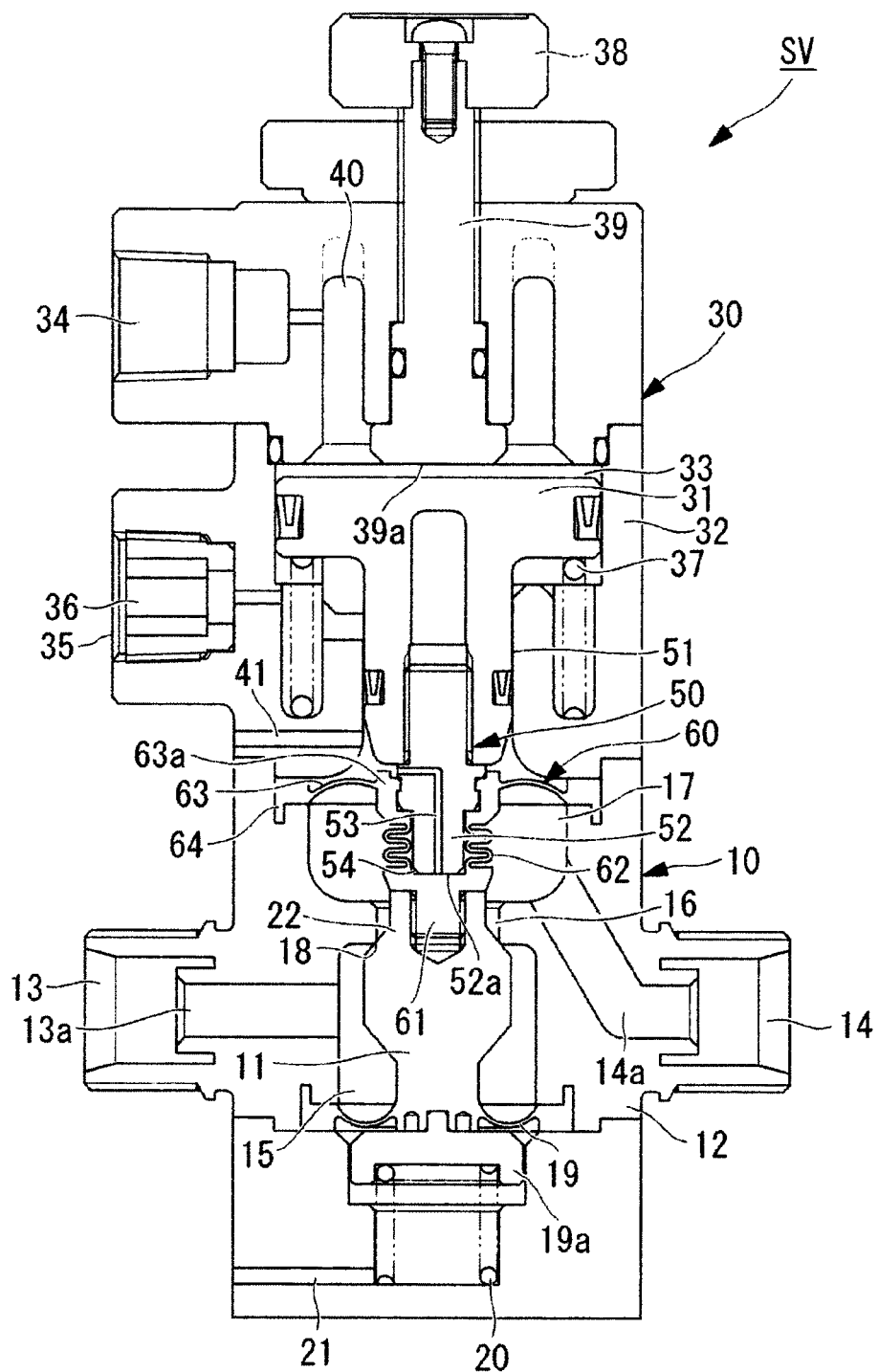
FIG. 2 is a sectional view showing an embodiment of the suck-back valve according to the present invention, showing a state before operating the suck-back function, with the open/close valve fully closed.
Figure 3:
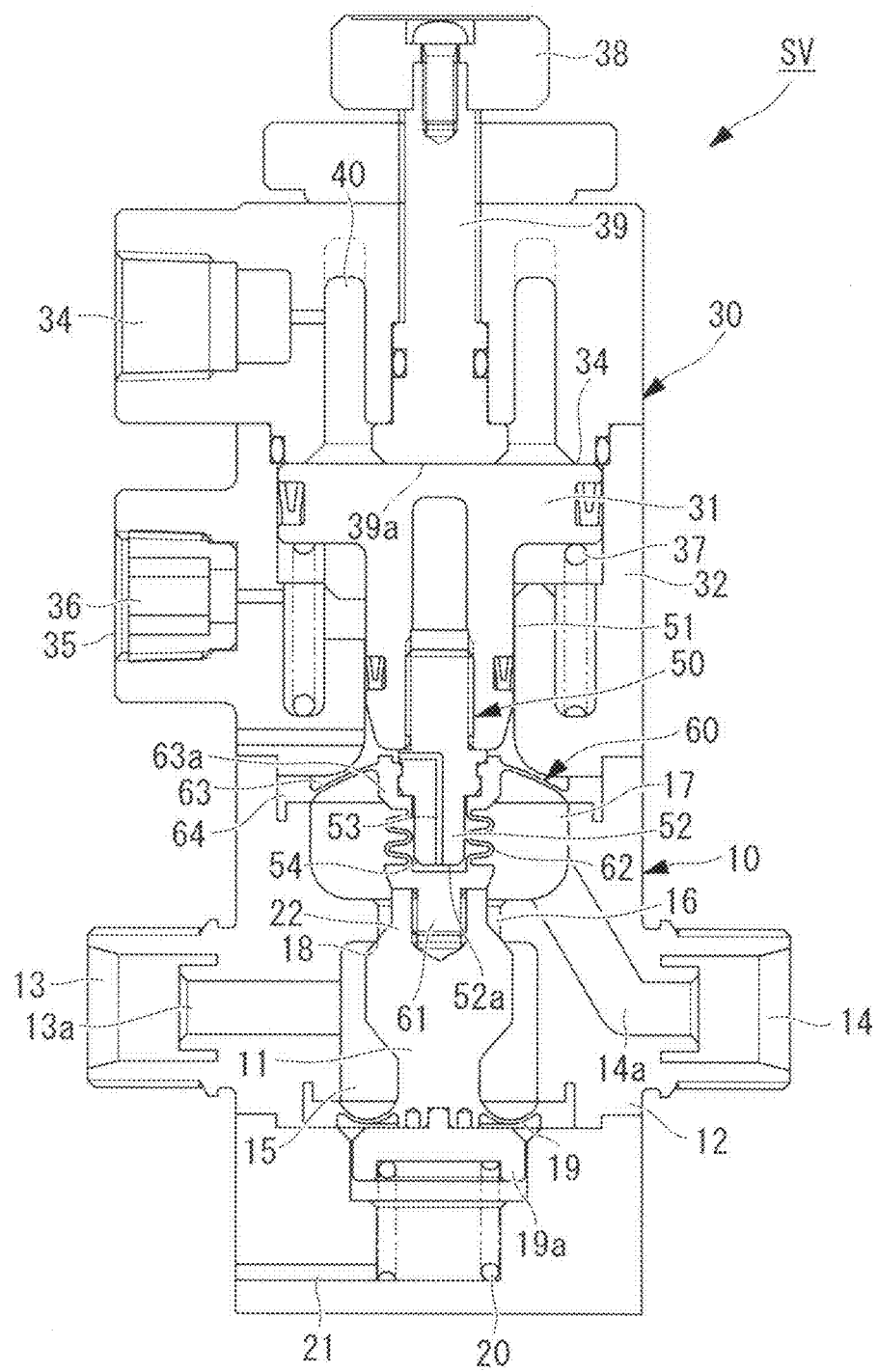
FIG. 3 is a sectional view showing the suck-back valve according to the present invention, showing a state in which the suck-back function is operated from the state in FIG. 2.

A suck-back valve SV shown in FIGS. 1 to 3 is integrally formed of an actuator 30 for the open/close operation and an open/close valve 10 that is installed in a channel through which fluid, such as chemicals, flows and that is provided with a suck-back function for preventing leakage when fully closing. That is, in the suck-back valve SV, a piston 31 of the actuator 30, which receives air pressure for operating the actuator (fluid pressure for the open/close operation), is linked via a shaft portion 50 to a valve body 11 which carries out the open/close operation of the open/close valve 10, and the open/close valve 10, which carries out the open/close operation using air pressure, is provided with the suck-back function.

Note that, for the illustrated suck-back valve SV, FIG. 1 shows the open/close valve 10 in a fully open state, FIG. 2 shows a state before operating the suck-back function, with the open/close valve 10 fully closed, and FIG. 3 shows a state in which the suck-back function is operated from the state in FIG. 2.

In the basic configuration of the open/close valve 10, a valve main body (casing) 12 is provided with a fluid inlet 13 and a fluid outlet 14, and the valve body 11, which opens/closes a fluid channel 16, is disposed in an internal space 15 of the valve main body 12. A suck-back chamber 17 communicating with the internal space 15 via the fluid channel 16 is formed above the fluid channel 16. The suck-back chamber 17 serves as part of a channel for flowing fluid in the open/close valve 10 (hereinafter, referred to as "valve internal channel") and is also the space in which part of the shaft portion 50 linked to the valve body 11 is disposed. In addition, the suck-back chamber 17 is also the space that achieves the suck-back function by increasing the volume through operation of a diaphragm 60 described later.

Note that the fluid inlet 13 communicates with the internal space 15 via an inlet channel 13a, and the fluid outlet 14 communicates with the suck-back chamber 17 via the outlet channel 14a.

Working together with the actuator 30 described later, the valve body 11 described above vertically moves in the internal space 15 along with the piston 31 and the shaft portion 50, thereby opening/closing the fluid channel 16 formed in the open/close valve 10. At the top-end portion of the internal space 15, in other words, at the inlet portion of the fluid channel 16, a seat portion 18 is provided. In this open/close valve 10, the fluid channel 16 is closed when the valve body 11 moves upward coming into close contact with the seat portion 18, and the fluid channel 16 is opened when the valve body 11 moves downward away from the seat portion 18.

The valve internal channel formed in the open/close valve 10 is arranged, in order of the flowing direction in the open/close valve 10, in the fluid inlet 13, the inlet channel 13a, the internal space 15, the fluid channel 16, the suck-back chamber 17, the outlet channel 14a, and the fluid outlet 14.

In addition, in the illustrated open/close valve 10, reference number 19 in the drawings is a lower diaphragm whose base portion 19a is linked to the lower portion of the valve body 11, 20 is a coil spring that biases the base portion 19a upward, and 21 is an exhaust channel. Note that, because the lower portion of the valve body 11 is narrowed to reduce the diameter thereof, the diameter of the lower diaphragm 19 can be reduced.

In the actuator 30, the piston 31 is disposed in a cylinder portion 33 of an internal space formed in an actuator main body 32, and the open/close valve 10 is open/close operated by supplying air pressure to either side of the cylinder portion 33 partitioned by the piston 31. In the illustrated configuration example, the actuator main body 32 is provided with two air pressure supply ports 34 and 35, one of which can be selected for use. In this case, the air pressure supply port 34 disposed at the top supplies air pressure to the upper surface side of the piston 31 that axially slides in the cylinder portion 33, and the air pressure supply port 35 disposed at the bottom supplies air pressure to the bottom surface side of the piston 31 that axially slides in the cylinder portion 33.

Note that, in the illustrated example, air pressure is supplied from the top air pressure supply port 34, and the lower air pressure supply port 35 is closed by a plug 36.

The piston 31 described above is constantly biased upwards (the direction in which the valve body 11 is closed) by a coil spring 37, and therefore, the illustrated open/close valve 10 is a normally closed type that is constantly closed in a state without the supply of air pressure. That is, although the valve body 11 is constantly in a closed state due to bias from the coil spring 37, when the air pressure is supplied from the air pressure supply port 34 to press down the piston 31, overcoming the bias of the coil springs 20 and 37, the valve body 11 linked via the shaft portion 50 is pressed down. As a result, the valve body 11 separates from the seat portion 18, shifting into an open state.

Note that when air pressure supply from the air pressure supply port 34 is halted, the piston 31 no longer exerts a downward pressing force, and thus, the valve body 11 comes into close contact with the seat portion 18 when biased by the coil springs 20 and 37, shifting into a closed state.

In addition, with respect to the suck-back function, described later, the actuator 30 described above is provided with a suck-back level adjusting portion that regulates the amount of axial movement of the shaft portion 50 on the piston 31 side. The suck-back level adjusting portion is a threaded shaft 39 that moves in an axial direction by operation of a handle 38, which makes it possible to adjust the amount by which a tip portion 39a protrudes into the cylinder portion 33. That is, if the amount by which the tip portion 39a protrudes into the cylinder portion 33 is increased, the range within which the piston 31 can rise (piston stroke) decreases, thus also decreasing the suck-back level (amount of change in the volume of the suck-back chamber 17), which is determined by the actuating amount (deformation amount) of a diaphragm 60, described later.

Note that reference numeral 40 in the figures is an installation space for a coil spring and is used as needed when, for example, selecting and changing the operation method (normally closed or normally opened) of the open/closed valve 10 and the actuator 30.

Next, the shaft portion 50 will be described, which is a member that links the piston 31 and the valve body 11 and that opens/closes the valve body 11 of the open/close valve 10 by operation of the actuator 30.

The shaft portion 50 is provided with a piston shaft portion 51 provided at the bottom surface of the piston 31 and a valve body shaft portion 22 provided at an upper portion of the valve body 11. A loosely-fitted shaft portion 52 is threaded to the piston shaft portion 51 at a shaft center position so as to protrude downward from the bottom surface. The loosely-fitted shaft portion 52 is provided with an exhaust channel 53 that communicates to the shaft side surface from the bottom-end surface 52a through the shaft center position. The exhaust channel 53 serves as a channel for allowing air in a loose-fitting portion 54, which is narrowed by the loosely-fitted shaft portion 52 to make the suck-back function described later operate smoothly, to flow out to the atmosphere. Note that the air that flows out to the exterior of the loose-fitting portion 54 through the exhaust channel 53 flows out to the atmosphere through a through-hole 41 provided in the actuator main body 32.

A base portion 61 of the diaphragm 60 is linked to the top surface of a valve body shaft portion 22 by threading thereto. The base portion 61 is integrally provided with bellows 62 that covers the circumference of the loosely-fitted shaft portion 52, and additionally, the top-end portion of the bellows 62 is provided with a top-end base portion 63a engaged to the loosely-fitted shaft portion 52. The top-end base portion 63a is engaged with the loosely-fitted shaft portion 52 by means of a corresponding protrusion and depression so as to integrally move in the axial direction.

The top-end base portion 63a is integrally provided with a diaphragm main body 63 that extends horizontally. Furthermore, an outer peripheral portion of the diaphragm main body 63 is provided with an outer edge portion 64 that is secured by being interposed between the open/close valve 10 and the actuator 30. Therefore, the diaphragm main body 63 is configured such that the diaphragm 63 and the loosely-fitted shaft portion 52 integrally operate while covering a top portion of the suck-back chamber 17, separating it from the space on the actuator 30 side.

In addition, on the upper surface side of the base portion 61, the loose-fitting portion 54, which makes it possible for the loosely-fitted shaft portion 52 to move in the axial direction, is formed inside the bellows 62. Therefore, the loose-fitting portion 54 is provided closer to the actuator 30 side than to the diaphragm 60, and the fluid that flows inside the open/close valve 10 is completely separated from a driving unit of the actuator 30 by the diaphragm 60. That is, the diaphragm 60 is provided so as to separate the actuator 30 and the suck-back chamber 17 on the open/close valve 10 side, and the loosely-fitted shaft portion 52 of the actuator 30 is configured to operate in the region without contacting the fluid, such as chemicals.

In this way, in the suck-back valve SV of the present invention, the suck-back chamber 17 formed in the valve internal channel of the open/close valve 10 and the actuator 30 that operates the piston 31 are separated by the diaphragm 60 which is linked to and integrally operates with the shaft portion 50. In addition, the shaft portion 50 is divided into a valve-body-side shaft portion constituted of the valve body shaft portion 22 and a piston-side shaft portion constituted of the piston shaft portion 51 and the loosely-fitted shaft portion 52, and the loosely-fitted shaft portion 52 of the piston-side shaft portion is loosely fitted to the base portion 61 of the diaphragm 60 integrally linked to the valve-body-side shaft portion 22, allowing for independent movement in the axial direction.

Therefore, during the closing operation of the valve body 11, a two-step operation is carried out, including a valve closing operation step in which the shaft portion 50, along with the piston 31 and the diaphragm 60, moves to the fully closed position of the valve body 11, and a suck-back operation step in which the piston shaft portion 51 and the loosely-fitted shaft portion 52 of the piston-side shaft portion move with the piston 31 and the diaphragm main body 63 of the diaphragm 60 to increase the volume of the suck-back chamber 17.

To describe this more specifically, in the suck-back valve SV in the fully open state shown in FIG. 1, a downward pressing force of the piston 31 ceases to act by halting the air pressure supply to the air pressure supply port 34, and thereby, the valve body 11 is pushed up along with the piston and the shaft portion 50 by the bias from the coil springs 20 and 37. As a result, as shown in FIG. 2, because the open/close valve 10 shifts to the fully closed state in which the valve body 11 is in close contact with the seat portion 18 and the fluid channel 16 is closed, the valve closing operation step of the valve body 11 is completed. Note that, in this step, because the surface 52a of the loosely-fitted shaft portion 52 is in close contact with the base portion 61 of the diaphragm 60, as in the fully open state in FIG. 1 described above, the suck-back function does not operate.

After the above-described valve closing operation step is completed, because it is locked to the seat portion 18, the valve body 11 is prevented from moving further up, and thus, the loosely-fitted shaft portion 52 separates from the base portion 61, moving upward with the piston 31 and the shaft portion 50. As a result, the top-end base portion 63a of the diaphragm main body 63 is pulled up along with the loosely-fitted shaft portion 52, and thereby, as shown in FIG. 3, the diaphragm main body 63 is deformed, increasing the volume of the suck-back chamber 17. Then, when the piston 31 returns to the top-end portion of the actuator main body 32, the increase in the volume of the suck-back chamber 17 also ends, completing the suck-back operation step. When the volume of the suck-back chamber 17 is thus increased, in the valve internal channel of the open/close valve 10 which is divided by closing the valve body 11, fluid remaining on the downstream side of the valve body 11 is sucked towards the suck-back chamber 17, thereby making it possible to prevent leakage.

In addition, when the protrusion amount of the threaded shaft 39a is changed by operating the handle 38, the position to which the piston 31 rises to return changes; therefore, the stroke of the loosely-fitted shaft portion 52 and the deformation amount of the diaphragm main body 17 also change. Accordingly, it is possible to adjust the amount of change (suck-back level) in the volume of the suck-back chamber 17, which increases in accordance with the deformation of the diaphragm main body 63.

In this way, with the suck-back valve SV of the present invention, the open/close operation of the open/close valve 10 and the suck-back function due to the diaphragm 60 can be achieved by a single actuator 30. That is, with the present invention, because the suck-back valve SV provided with the suck-back function can be provided in the open/close valve 10, with the suck-back valve SV wherein the function of the open/close valve and the suck-back function are integrated, it becomes possible to reduce the installation space, and the problem of synchronizing the actuator 30 is also solved.

In addition, in the loose-fitting portion 54 that carries out the suck-back operation, because the configuration thereof is such that the loosely-fitted shaft portion 52 that carries out the suck-back function is separated by the bellows 62 so as not to come in contact with the fluid flowing in the valve internal channel, fluid to be handled, such as chemicals, does not adhere to the loose-fitting portion. Therefore, it is possible to prevent the occurrence of a malfunction of the suck-back function and to increase the reliability of the suck-back valve SV.

Incidentally, in the above-described embodiment, the loose-fitting portion 54 is covered with the bellows 62; however, it is not limited to this. Nonetheless, because the bellows 62 easily extends and contracts in the axial direction, the operation of the loosely-fitted shaft portion 52 can be smoothly carried out. Note that, depending on the stroke of the loosely-fitted shaft portion 52, a suitable deformation may be provided instead of an extending/contracting portion such as the bellows 62.

Note that the present invention is not limited to the above-described embodiment, and various modifications are possible without departing from the spirit of the present invention.

The invention claimed is:

1. A suck-back valve, in which a piston and a valve body that receive fluid pressure for an open/close operation are linked via a shaft portion, and an open/close valve that carries out the open/close operation of the valve body by the fluid pressure is provided with a suck-back function, wherein
   a suck-back chamber formed in a valve internal channel of the open/close vale and an open/close operation portion that operates the piston are separated by a diaphragm that is linked to and integrally operates with the shaft portion;
   the shaft portion is divided into a valve-body-side shaft portion and a piston-side shaft portion, and the piston-side shaft portion is loosely fitted to the valve-body-side shaft portion, allowing for independent movement in an axial direction; and
   during the closing operation of the valve body, a two-step operation is carried out, including a valve closing operation step in which the shaft portion, along with the piston and the diaphragm, moves to the fully closed position of the valve body, and a suck-back operation step in which the piston pulls on the loosely-fitted piston-side shaft portion to disengage the loosely-fitted piston-side shaft position from a diaphragm base portion and the valve body, thereby increasing the volume of the suck-back chamber.

2. The suck-back valve according to claim 1, wherein the loose-fitting portion, in which the piston-side shaft portion is loosely fitted to the valve-body-side shaft portion, is provided closer to the open/close operation portion side than to the diaphragm.

3. The suck-back valve according to claim 2, wherein the outer periphery of the loose-fitting portion is covered with the diaphragm, which is integral with bellows.

4. The suck-back valve according to claim 1, wherein the suck-back level adjusting portion, which regulates the amount of axial movement of the piston-side shaft portion, is provided.

5. a suck-back valve, comprising:
   a valve main body defining a fluid inlet connected to a fluid outlet via a fluid channel including a suck-back chamber;
   a valve body disposed in the fluid channel, the valve body opening and closing the fluid channel;
   an actuator main body connected to the valve main body;
   a piston slidably disposed in the actuator main body, the piston having a piston shaft portion;
   a loosely-fitted shaft portion connected to the piston shaft portion; and
   a diaphragm disposed in the suck back chamber, between the loosely-fitted shaft portion and the valve body, the diaphragm comprising a diaphragm main body and a diaphragm base portion;
   wherein the diaphragm base portion is connected to the valve body,
   wherein the loosely-fitted shaft portion pushes on the diaphragm base portion and the valve body to open the valve, and
   wherein the piston pulls on the loosely-fitted shaft portion to disengage the loosely-fitted shaft portion from the diaphragm base portion and the valve body, thereby increasing the volume of the suck-back chamber.

6. The suck-back valve of claim 5, wherein the diaphragm further comprises a bellows extending between the diaphragm main body and the diaphragm base portion, the bellows surrounding at least a portion of the loosely-fitted shaft portion.

7. The suck-back valve of claim 6, wherein an end of the loosely-fitted shaft portion extends into the suck-back chamber, within the bellows.

8. The suck-back valve of claim 6, wherein, when the piston pulls on the loosely-fitted shaft portion to disengage the loosely-fitted shaft portion from the diaphragm base portion, the bellows expands to increase the volume of the suck-back chamber.

* * * * *